United States Patent [19]

Glass et al.

[11] 4,192,707

[45] Mar. 11, 1980

[54] HEAT TREATMENT OF CHRYSOTILE ASBESTOS FIBRES

[75] Inventors: Roger W. Glass, Oakville; Richard A. Kuntze, Mississauga, both of Canada

[73] Assignee: Ontario Research Foundation, Mississauga, Canada

[21] Appl. No.: 865,410

[22] Filed: Dec. 29, 1977

[30] Foreign Application Priority Data

Jan. 12, 1977 [GB] United Kingdom ............... 1222/77

[51] Int. Cl.$^2$ ............................................. D21B 1/02
[52] U.S. Cl. ....................................... 162/3; 162/153; 162/154; 423/167; 423/331; 432/13
[58] Field of Search ................... 162/3, 153, 154; 423/167, 331; 432/13

[56] References Cited

U.S. PATENT DOCUMENTS

| 2,616,801 | 11/1952 | Bodollet et al. | ............... 162/153 |
| 3,215,494 | 11/1965 | Hemstock | ............... 423/331 |

OTHER PUBLICATIONS

Fibrous Silicates, Hodgson, Lecture Series, 1965, No. 4, Royal Institute of Chemistry, London.

*Primary Examiner*—S. Leon Bashore
*Assistant Examiner*—Peter F. Kratz

[57] ABSTRACT

Asbestos fibres having excellent properties in resin reinforcement are produced by controlled heat treatment of a coarse fraction of chrysotile asbestos fibres.

6 Claims, No Drawings

HEAT TREATMENT OF CHRYSOTILE ASBESTOS FIBRES

FIELD OF INVENTION

This invention relates to the production of novel asbestos fibres from conventional soft chrysotile asbestos.

BACKGROUND TO THE INVENTION

Asbestos is used as a reinforcing fibre in fibre-filled plastic materials. Two important properties of the resulting composite material are the impact strength and the flexural strength. When most types of chrysotile asbestos are used as reinforcing fibres, the composite material has generally relatively good flexural strength and stiffness but poor impact strength. In many instances, it is therefore advantageous to improve the impact strength.

Some naturally occurring, very harsh chrysotile asbestos fibre having particularly good flexural strength and stiffness properties as a reinforcing fibre in fibre-filled resins is known to be relatively long, very straight and smooth-surfaced. Available quantities of this fibre are limited and a comparable asbestos fibre has not heretofore been produced synthetically.

SUMMARY OF INVENTION

In accordance with the present invention, chrysotile asbestos fibres are heat treated to obtain an improvement in impact strength properties for a coarse fraction thereof when used in resin reinforcement without incurring any strength loss through loss of water of crystallization other than a very minor loss. The coarse fraction may be initially separated from the chrysotile asbestos fibres or may be separated from heat treated fibres.

The heat treatment is effected in an ambient atmosphere having a substantially uniform temperature of about 400° to about 600° C. for a time from about 1 to about 5 hours sufficient to increase the impact strength of the coarse fraction of fibres in resin reinforcement and insufficient to result in a significant degree of dehydroxylation of the fibres, which would impair the impact strength properties. The heating may be effected in any convenient apparatus, such as, a large scale muffle furnace.

The heating of the fibres is controlled by a temperature-time relationship to avoid loss of water of crystallization and the maximum water loss (dehydroxylation) which can be tolerated is about 2% by weight of the total water of crystallization, the latter value being the "significant degree of dehydroxylation" mentioned above. It is preferred to achieve the increased impact strength properties without any dehydroxylation.

GENERAL DESCRIPTION OF INVENTION

The asbestos fibres may be treated by the procedure of the invention in a bulk form but it is more convenient and preferred to treat the fibres in a pressure packed form. Pressure packing decreases considerably the volume of the fibres to be treated and permits commercial operation, since large volumes of fibres can be simultaneously heat treated.

When in the pressure packed form, it takes some time for the heat to permeate the block, so that fibres in outer portions of the block may be heat treated at the ambient atmosphere temperature for longer periods than those towards the centre of the block. This heating pattern results in an overall improvement in impact strength properties in resin reinforcement for the coarse fibres in the block without strength loss, although the individual properties of the fibres in the block may vary.

Pressure packing, when effected, is preferably carried out to provide a density in the pressure pack of about 25 to about 50 lb./cu.ft. (200 to 800 Kg/M$^3$). The pressure pack typically is formed from a 100 lb. (50 Kg) lot of fibres and may be dimensioned 24"×16"×9".

In a preferred embodiment of the invention, the chrysotile fibres are heated in an ambient atmosphere having a temperature of about 500° to about 550° C. for about 2 to 3 hours, usually in a pressure packed form having a density of about 25 to about 50 lb./cu.ft.

Two alternative procedures are possible within the scope of the invention to produce the novel fibres having high impact strength properties. In the first of these alternatives, the chrysotile asbestos fibres are heat treated and, thereafter, the heat treated fibres are classified and the coarse fraction is collected.

In one embodiment of this procedure, the heat treated fibres are opened to a limited extent by any convenient procedure, such as, by using a fan opener to an average surface area of about 4000 to about 8000 sq.cm/g. The fibres then are classified to separate the coarse fraction. The classification may be effected using an air classifier, particularly a Centri-Sonic classifier.

The coarse fibre fraction obtained in this embodiment constitutes about 10 to about 35% of the total opened fibres, with the quantity varying with the temperture of heat treatment. The ratio of coarse fraction to fines fraction produced also may be varied by controlling the speed of rotation of the classifier and the rate of air flow therethrough.

The fines fraction from the classification may be discarded or usefully used for asbestos cement reinforcement with improved filtration properties, in accordance with the disclosure of our U.S. application Ser. No. 824,929 filed Aug. 15, 1977.

In the other alternative, the chrysotile asbestos fibres first are classified to separate a coarse fraction which then is heat treated. The fines fraction may be discarded or separately heat treated in accordance with our aforementioned U.S. application.

While the procedure of the invention has wide applicability to a variety of grades of chrysotile asbestos fibres, it has particular utility with respect to those chrysotile asbestos fibres classified as Group 4 and Group 5 by Quebec Asbestos Mining Association.

The heating process carried out in accordance with this invention changes the physical characteristics of the coarse fraction of asbestos fibres. The heat treated coarse fraction resulting from the process of the invention is in the form of long, very straight and smooth-surfaced hard fibres which are longitudinally alignable for thermosetting resin reinforcement and readily dispersed for thermoplastic resin reinforcement.

The fibres exhibit a high impact strength in fibre-filled resins which is greater than the natural very harsh fibres, although they exhibit lower flexural strength than the natural very harsh fibres. The fibres produced in this invention generally have diameters of about 0.1 mm to about 2 mm and lengths up to about 8 mm.

The coarse fibres provided following the procedure of the invention may be opened further, typically to an average surface area of about 3000 cm$^2$ per gram. The further opened fibres have both the appearance and reinforcing properties of the natural very harsh fibre, including the flexural strength properties.

EXAMPLE

Chrysotile asbestos fibres (Group 4) were formed into a pressure-packed block and heated at 500° C. for 2 hours in a muffle furnace. Following the heat treatment and cooling of the block, the fibres were opened to an average surface area of about 7000 cm$^2$/g using a fan opener.

The opened fibres were fed to a Centri-Sonic classifier operating under conditions which will produce 10 to 15% rejects. The rejects were relatively coarse and very straight fibres. The reinforcing characteristics of this fraction in high density polyethylene were tested and compared with those of ¼ inch glass fibres, another chrysotile material (Calidria RG600) widely used as a reinforcing material, the very harsh fibre and the rejects fraction opened to 3000 cm$^2$/g.

In each case, the resin and fibres (30% by weight of mixture) were compounded on a two-roll mill for 2 minutes at 275° F., cooled and broken into pieces approximately 1"×1"×¼". The pieces were compression molded at 275° F. and 1000 psi.

The resulting materials were subjected to various tests and the results are reproduced in the following Table I:

TABLE I

|  | Izod Impact Strength (ft.lb./inch) | Flexural Strength (psi) | Flexural Modulus (psi) | Colour |
|---|---|---|---|---|
| Very Harsh Fibre | 0.46 | 8000 | 710,000 | Black |
| Calidria RG 600 | 0.66 | 7420 | 624,000 | Dark Green |
| Glass Fibres | 1.26 | 5990 | 537,000 | White |
| Classified Coarse Fraction (unopened) | 0.99 | 6900 | 580,000 | Light Brown |
| Classified Coarse Fraction Opened to 3000 cm$^2$/g | 0.45 | 7600 | 710,000 | Light Yellow |

The results of the above Table I show the high impact strength properties of the coarse fraction and the very close comparison of the properties of the opened fraction and the very harsh fibre.

The fines fraction from the classifier was tested for its properties in asbestos-cement. These properties were compared with those of untreated fibres which had been otherwise processed to produce their optimum properties. The results are reproduced in the following Table II:

TABLE II

| Property | Classified Fines Fraction | Untreated Fibres |
|---|---|---|
| Filtration rate (ml/sec) | 22.8 | 13.1 |
| Water retention (%) | 16.2 | 20.4 |
| Plaque density (g/cm$^3$) | 1.41 | 1.60 |
| Modulus of rupture adjusted for density (kg.cm$^2$) | 516 | 527 |

The results of the above Table II demonstrate that the heat treated, opened and fine classified fibres exhibit substantially no decrease in modulus of rupture and an increase in asbestos-cement filtration rate of about 75%.

SUMMARY

The present invention, therefore, provides a procedure for forming novel asbestos fibres from chrysotile asbestos fibres. Modifications are possible within the scope of the invention.

What we claim is:

1. A method for the formation from Group 4 or Group 5 chrysotile asbestos fibres of long, very straight, smooth-surfaced, hard asbestos fibres having enhanced impact strength in resin reinforcement, which comprises:
   initially separating a coarse fraction from said chrysotile asbestos fibres and heat treating said coarse fraction to form said hard asbestos fibres;
   said heat treatment being effected by heating in an ambient atmosphere having a substantially uniform temperature of about 400° to about 600° C. for a time from about 1 to about 5 hours sufficient to increase the impact strength of the coarse fraction of fibres in resin reinforcement and insufficient to result in a loss of water of crystallization of the fibres of greater than about 2% by weight of the total weight of water of crystallization.

2. The method of claim 1 wherein said heat treatment is effected to achieve a maximum increase in said impact strength properties without any loss of water of crystallization from the fibres.

3. The method of claim 1 wherein said heat treatment is effected in an ambient atmosphere at a temperature of about 500° to about 550° C. for about 2 to 3 hours.

4. The method of claim 1 wherein said fibres are in a pressure packed form during said heating step.

5. The method of claim 4 wherein said fibres are pressure packed to a density of about 25 to about 50 lb./cu. ft.

6. The method of claim 1 including opening said coarse fraction to an average surface area of about 3000 cm$^2$/g.

* * * * *